United States Patent
Cohn

[15] 3,701,891
[45] Oct. 31, 1972

[54] METHODS OF AN SYSTEMS FOR COORDINATED SYSTEM-WISE ENERGY BALANCING IN THE CONTROL OF BULK POWER TRANSFER

[72] Inventor: Nathan Cohn, Jenkintown, Pa.
[73] Assignee: Leeds & Northrup Company, North Wales, Pa.
[22] Filed: May 26, 1971
[21] Appl. No.: 146,980

[52] U.S. Cl. ..............235/151.21, 235/184, 307/57
[51] Int. Cl. ..............................................G06g 7/62
[58] Field of Search ............235/151.21, 183; 307/57

[56] References Cited

UNITED STATES PATENTS

| 2,688,728 | 9/1954 | Carolus | 307/57 X |
| 2,773,994 | 12/1956 | Cohn | 307/57 |
| 2,866,102 | 12/1958 | Cohn | 235/151.21 X |
| 3,124,699 | 3/1964 | Kirchmayer | 307/57 |
| 3,465,164 | 9/1969 | Couvreur | 307/57 |
| 3,538,317 | 11/1970 | Fukuda | 235/183 |

OTHER PUBLICATIONS

Cohn: Considerations in the Regulation of Interconnected Areas, IEEE Trans. PAS- 86, No. 12, 1967; Paper No. 1.

Cohn: The Use of Synchr. Time and Frequency Standards to Improve Control. North Am. Power Com. 2-26-69; No. 2.
Cohn: Power Systems Time and Frequency L & N Techn. Journal 7 1969; Paper No. 3.
Cohn: Bias Revisited North Am. Power Syst. April 1970, Paper No. 4.

Primary Examiner—Felix D. Gruber
Attorney—Woodcock, Washburn, Kurtz & Mackiewicz

[57] ABSTRACT

In order to achieve coordinated system-wide energy balancing in the control of bulk power transfer, the system known as the net interchange tie-line bias control is modified so as to reduce inadvertent interchange to zero while at the same time maintaining the average frequency of the interconnection as a whole at a predetermined value. This is accomplished by introducing into the control system of each area a coordinated modifying function corresponding with the quotient of the inadvertent interchange for each area measured over a span of time common to all areas divided by a constant, representative of a common corrective time period for all areas, together with an additional modifying factor representative of the time integral of frequency deviation over a predetermined time period common to all areas multiplied by a bias factor common to all areas.

8 Claims, 3 Drawing Figures

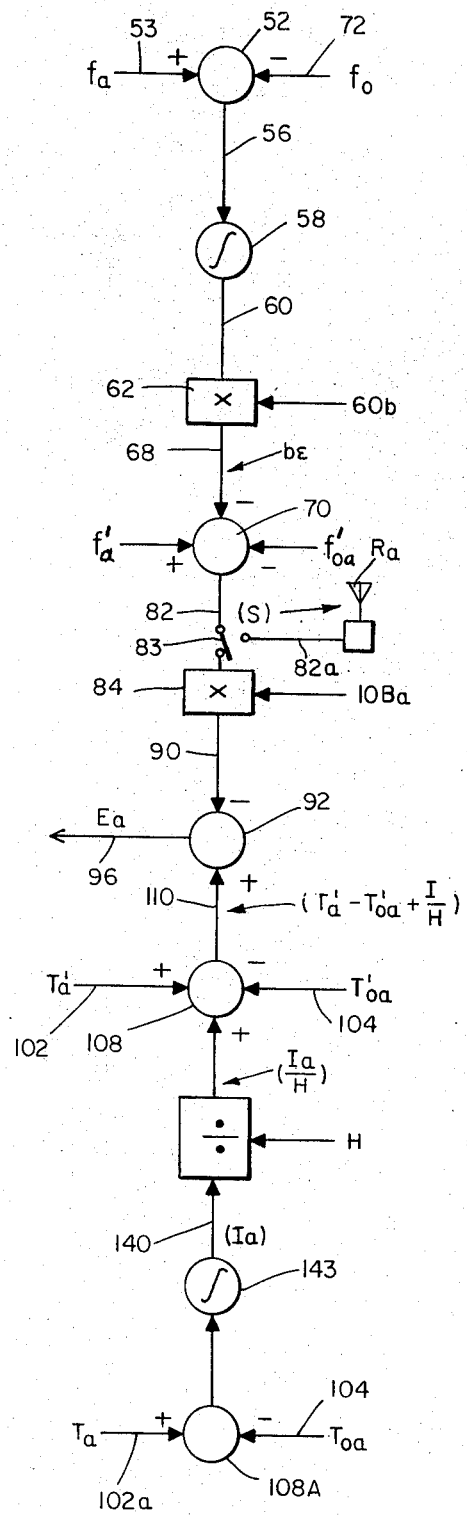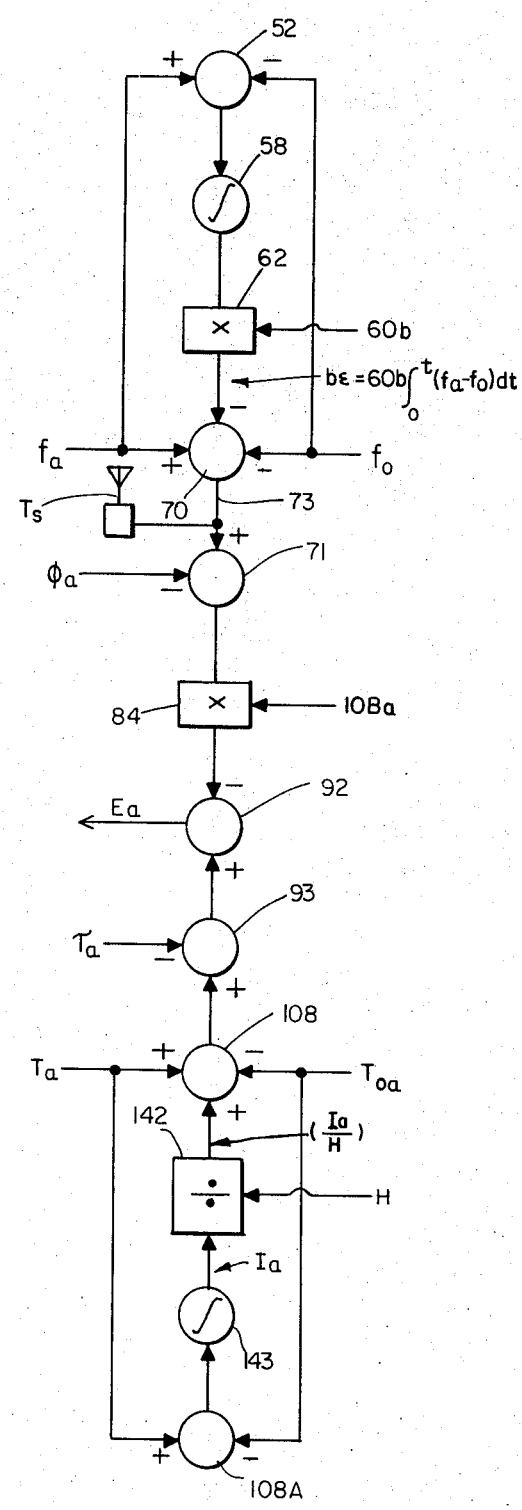
*Fig. 1*  *Fig. 2*

METHODS OF AN SYSTEMS FOR COORDINATED SYSTEM-WISE ENERGY BALANCING IN THE CONTROL OF BULK POWER TRANSFER

BACKGROUND OF THE INVENTION

The most common approach to the control of the generation within a particular load distribution area is the system known as net interchange tie-line bias control which operates to control the output of the generating units of the area so as to tend to maintain the area control-error signal at zero when the area control-error signal is calculated in accordance with the following equation:

$$E = (T - T_o) - 10B(f - f_o) \qquad (1)$$

where
- $E$ = the area control error.
- $T$ = the measured net interchange of the area in megawatts. Power flow "out" of an area is considered as positive.
- $T_o$ = the scheduled net interchange of the area in megawatts, as preset.
- $B$ = the frequency bias setting for the area in megawatts per 0.1 Hertz and is considered to have a minus sign.
- $f$ = system frequency in Hertz.
- $f_o$ = the system frequency schedule in Hertz, as preset.

The control signals which effect the change in generation of the generators are usually derived by coordinating the area control error with a number of other measured or computed parameters so that the economy and the security of the area are optimized while the area control error is being reduced to zero. A system utilizing net interchange tie-line bias control is disclosed in my U.S. Pat. No. 2,773,994, issued Dec. 11, 1956.

In accordance with Equation (1) the control action in each area is in direction to reduce its area control error $E$ to zero. For a hypothetically perfect operation, the interconnection will automatically achieve its scheduled frequency $f_o$ and net interchanges will be on schedule when the control error $E$ for each area is zero. In order for this perfect operation to be achieved the following criteria must be met:

1. All portions of the interconnection must be included in one area or another so that the sum of all area generation, loads and losses is the same as total system generation, load and losses.
2. The algebraic sum of all area net interchange schedules must be equal to zero.
3. The use of a common scheduled frequency $f_o$ for all areas, and
4. The absence of metering or computational errors.

Such requirements are seldom fulfilled. The reasons include the need to adjust area generation at rates which will keep pace with area load changes. The failure so to do may be the result of the characteristic of the controller or it can be caused by the pursuit in the area of an economic dispatch schedule which may include the addition of sources of generation which have quite different characteristics than those under control at the time the additional sources are brought into the system. There will frequently be involved error in frequency measurement at the several areas involved together with the possibility that the predetermined or set frequency at each area may not be precisely the same. All of these factors add to the complexity of the control problem.

As the size of interconnections has increased, the concept of inadvertent interchange has become important in the resultant control problem. As used herein, inadvertent interchange can be taken to mean the time integral of the deviation of an area's net interchange from its interchange schedule $(T - T_o)$, which is to say inadvertent interchange is:

$$\int_0^t (T - T_o) dt$$

It includes an intentional component which results from frequency bias action when frequency is not at its scheduled value. It includes an unintentional component which results from such things as meter errors, schedule setting errors, or failure of an area control system to reduce to zero the control error for an area.

Since the general practice now is for each area to make payments based not upon measurements of exchange of power as determined by the KWH meters but rather on scheduled interchange, the importance of an effective system-wide control to minimize inadvertent interchange, to correct for it after it occurs, and which at the same time corrects time-error may be well understood.

It is accordingly an object of this invention to provide methods of and systems for coordinated system-wide energy-balancing in the control of bulk power transfer by control actions which correct for inadvertent interchange and which at the same time corrects for time-error — all on a system-wide basis.

SUMMARY OF THE INVENTION

In carrying out this invention in one form thereof, there are provided a method and system for producing generation control quantities for each of a plurality of interconnected areas of a power system to maintain on average the scheduled net interchange of power by reducing to zero the inadvertent interchange while at the same time maintaining the average frequency of the interconnection as a whole at a predetermined value. In this way there is achieved coordinated system-wide energy balancing in the control of bulk power transfer. This method includes the steps of algebraically subtracting the scheduled net interchange for each area from the measured net interchange to obtain first quantities, one for each said area. There is then algebraically added to each of these quantities the quotient of the inadvertent interchange for the corresponding area over a span of time common to all areas divided by a divisor common to all areas representing a time period (H) during which a correction is to be effected. This time period, identical for each area, is long enough to minimize control instability and short enough to avoid continued accumulation of inadvertent interchange of power. In this manner second quantities are generated, one for each area.

Concurrently with the performance of the foregoing steps correcting quantities are generated, one for each area. This is done by utilizing for each area the same selected desired frequency which is then algebraically subtracted from the measured frequency of the system as a whole. There is then algebraically subtracted from the resultant difference the integral of that difference multiplied by a time-error bias factor or setting which is common to all areas and which is representative of the rate at which the time-error correction is to be accomplished. This then produces third quantities, one for each area. Each of the latter quantities is then multiplied by a frequency bias setting unique for the corresponding area to produce area correcting quantities.

By now algebraically subtracting each area correcting quantity from the corresponding one of said second quantities, as defined above, there are produced control quantities utilized for the coordinated reduction toward zero of the inadvertent interchange for each area measured over a span of time common to all areas while maintaining on average the frequency of the system as a whole at a predetermined value.

BRIEF DESCRIPTION OF THE DRAWINGS

FIG. 1 is a simplified diagrammatic representation of a computing system embodying the present invention;

FIG. 2 is a simplified computing system similar to FIG. 1 but with added elements useful in understanding the invention.

DESCRIPTION OF THE PREFERRED EMBODIMENT

Figure 3:
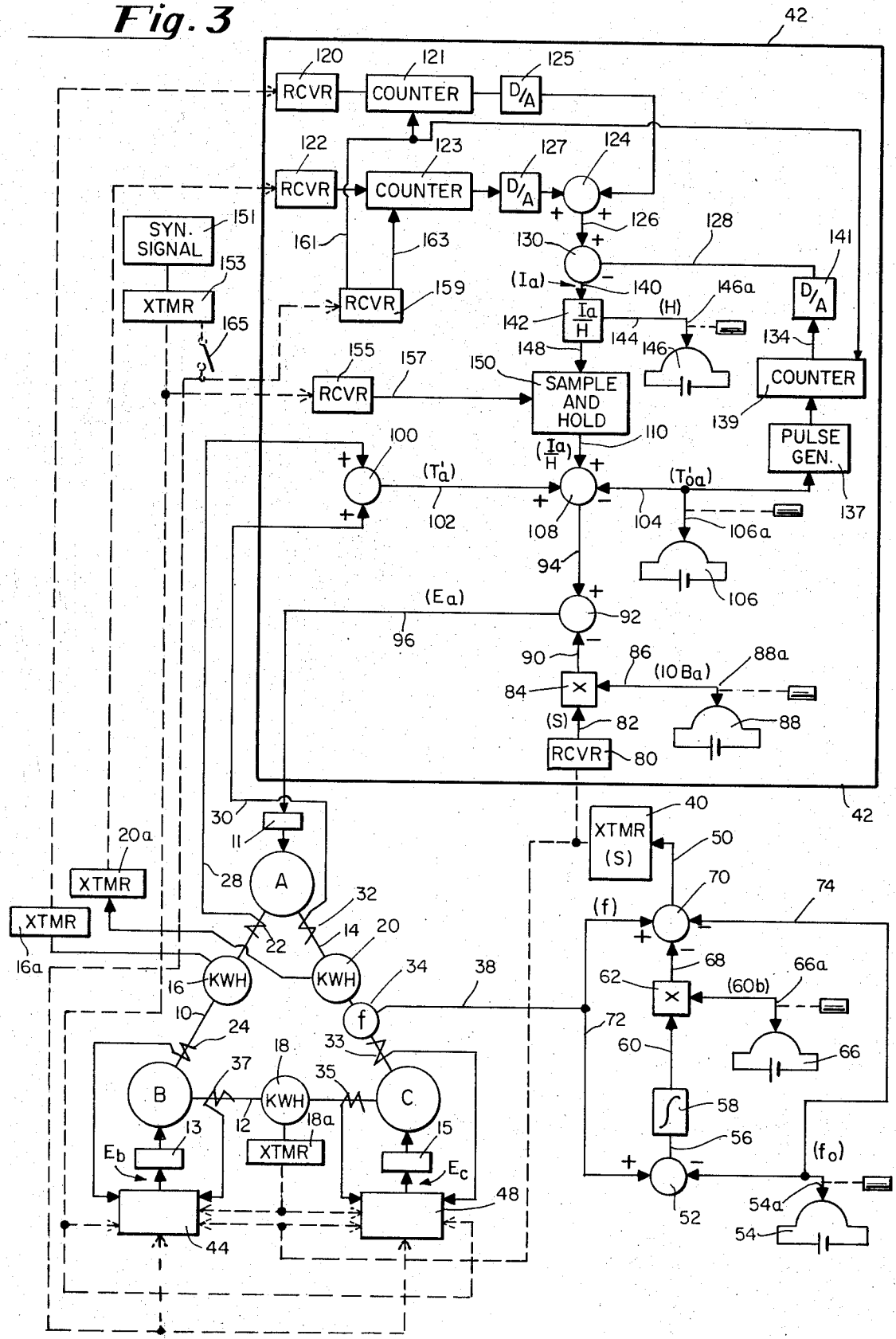
FIG. 3 is a more detailed diagrammatic illustration of the system of FIG. 1.

As explained above an interconnection may be very extensive, the one in the United States, as illustrated in FIG. 3 of my Leeds & Northrup Technical Paper No. E7.0014RP entitled "Bias Revisited," extending from coast to coast and including tie-lines into Canada.

The principles on which my invention is based can be well understood by reference to the simplified systems of FIGS. 1 and 2 and to the more complete system of FIG. 3 where only areas A, B and C have been illustrated. They are shown interconnected only by tie-lines 10, 12 and 14 to form an interconnection which may be taken as illustrative of a larger interconnection, one which may include more than one tie-line between adjacent areas.

Each of the areas will in general include a plurality of generating units interconnected to provide the necessary generation for the load in the area and also to provide the scheduled flow of power over the tie-lines interconnecting it with other areas of the system. Also, each of the areas may include its own control system 11, 13 and 15 which utilizes the net-interchange tie-line-bias-control approach for distributing the generation requirements amongst the generators of each area.

A brief discussion of the applicable equations and the significance of the several terms thereof will be helpful in understanding both the background theory and the control actions which produce coordinated system-wide energy balancing in the control of bulk power transfer as between a multiplicity of areas making up the interconnection. Since there may be as many as 120 areas or more forming an interconnection, only the three areas illustrated in FIG. 3 will be discussed.

The principal departures from prior practice involves the introduction of terms in Equation (1) for each area to provide coordinated system-wide correction of area inadvertent interchange accumulations and system time error accumulations.

Area inadvertent interchange accumulations and system time error develop as a result of:

1. Ineffective regulation in any of the areas of the system, identified as $E$ errors;
2. Errors in the measurement of frequency or in the setting of frequency schedule in any of the areas, identified in the aggregate for that area as a phi ($\phi$) error, and
3. Errors in the measurement of area net interchange or in the setting of area net interchange schedule identified in the aggregate for each area as a tau ($\tau$) error.

Equations defining the influences of each of these causes on system frequency, system time error, area net interchange deviation from schedule, and area inadvertent interchange accumulations are developed in my IEEE Transaction Paper No. 71TP81-PWR presented February 1971 at the IEEE Winter Power Meeting.

For additional background the following equation, incorporating the tau and phi terms referred to above, as well as the corrective terms forming part of the inventive concept will be helpful.

$$E_a = (T_a - T_{oa} - \tau_a + I_a/H) - 10\, B_a\, (f_a - f_{oa} - \phi_a - b\epsilon) \quad (2)$$

$E_a$ is the area control error for area A $T_a$ is the true net interchange for area A $T_{oa}$ is the true net interchange schedule for area A $\tau_a$ is any error in the net interchange measurements or in the net interchange schedule setting of area A $f_a$ is the true system steady state frequency, $f$ $f_{oa}$ is the true system steady state frequency schedule, $f_o$ $\phi_a$ is any error at area A, in the measurement of frequency, or in the setting of frequency schedule $I_a$ is the inadvertent interchange accumulation in area A measured over a span of time common to all areas for the measurement of their respective inadvertent interchange $H$ is a constant common to all areas which represents the time period within which inadvertent interchange accumulations are to be corrected $B_a$ is the frequency bias setting for the area in megawatts per 0.1 Hertz and is considered to have a minus sign $\epsilon$ is the system accumulated time-error in seconds, common to all areas. For a system where $f_o$ equals 60, epsilon may be written as:

$$\epsilon = 60 \int_0^t (f_a - f_o)\, dt$$

$b$ is the time-error bias setting in Hertz per second of-time error, has a negative sign, and is common to all areas; and $t$ is the span of time in hours over which the time error has accumulated.

FIG. 2 is a simplified representation of a system for calculating area control error in accordance with Equation (2). It should be noted, however, that Equation (2)

and FIG. 2 each includes tau ($\tau$) and phi ($\phi$) error terms which are related to the corresponding measured and scheduled set values by the following relationships:

$$\tau_a = T'_{oa} - T_{oa} - T'_a + T_a \qquad (3)$$

$$\phi_a = f'_{oa} - f_{oa} - f'_a + f_a \qquad (4)$$

where
- $T'_{oa}$ is the value of net interchange schedule for area A as actually set in the area,
- $T'_a$ is the net interchange for area A as actually measured in the area,
- $f'_{oa}$ is the frequency schedule as actually set in area A, and
- $f'_a$ is the system frequency as actually measured in Area A.

It will now be clear that FIG. 2 does not include actual measured quantities in area A for system frequency, or net interchange, or actual schedules set in area A for system frequency or net interchange. Instead it includes the true values for these parameters along with a phi ($\phi$) factor to compensate for errors in frequency measurement and in frequency schedule-setting, and along with a tau ($\tau$) factor to compensate for errors in interchange measurement and in interchange schedule setting. This representation is useful in identifying causes of inadvertent interchange and time error and the need for introducing corrective factors.

In FIG. 1 a transition has been made from FIG. 2 to show actual measured values at the adders or summation points 108 and 70 in the area for frequency, net interchange and actual schedule settings in the area for frequency and net interchange. Included in FIG. 1, as in FIG. 2, are the quantities $I_a/H$ and $b\epsilon$. These quantities as utilized in the system of FIG. 1 and as expressed by following Equation (7) take into account and provide the needed corrective actions notwithstanding the errors inherent in the area error computing system as exemplified by the tau factor and the phi factor discussed above.

The integration at 143 in FIG. 1, as in FIG. 2, remains based on the true values of area net interchange, $T_a$, and area net interchange schedule $T_{oa}$, which may not necessarily be continuously available for use at summing point 108. Accordingly the true values of $T_a$ and $T_{oa}$ are shown as used at summing point 108A for in this way only would the true inadvertent interchange ($I_a$) be known. However, the measured values of $T'_a$ and $T'_{oa}$ are shown as used at summing point 108. Similarly, the true values of system frequency, $f_a$, and system frequency schedule, $f_o$, remain in FIG. 1 at summation point 52, as in FIG. 2, to provide a true basis for computing system time-error, after integration at 58 for computing epsilon ($\epsilon$). The parameters $f_a$ and $f_o$ may not be continuously available for use at summation point 70. The values for $f'_a$ and $f'_{oa}$ are continuously available and are used at summing point 70. The manner in which there are attained in practice the needed measurements of the true values of $f_a, f_{oa}$ and of $T_a$ and $T_{oa}$ will now be explained.

The quantity ($b\epsilon$) in FIG. 1 corresponds to the same quantity in FIG. 2 and is given by the equation $$b\epsilon = 60b \int_0^t (f_a - f_o)dt \qquad (5)$$

It is to be noted that if at any one point of the interconnected power system a continuous summation as shown in FIG. 2 at 70 can be made this would then provide, for use in all areas, a signal defined as follows:

$$S = (f_a - f_o - b\epsilon) \qquad (6)$$

Such a signal broadcast from a central location, as at $T_s$, FIG. 2, to all areas would eliminate, in all areas, any phi ($\phi$) errors. In effect the $S$ signal received as at $R_a$ at an area, area A, would be inserted in FIG. 1 in place of all of the parameters and computing elements shown above switch 83 in that Figure. That switch would then be in its right-hand position.

In FIG. 1 inadvertent interchange, $I_a$, is obtained after integration at 143 of the true value of net interchange flow as metered by suitable measuring devices such as watthour meters. The signals from such measuring devices may not be continually available for use at summation point 108.

The computations of FIG. 1 are summarized in the following equation:

$$E_a = ---, T'_a - T'_{oa} + (I_a/H) --- 10 B_a (f'_a - f'_{oa} - b\epsilon) \qquad (7)$$

In both FIGS. 1 and 2 insofar as the reference characters refer to corresponding circuit elements, they are the same as in FIG. 3.

Referring to the lower portion of FIG. 1 and to the first parenthetical expression of Equation (7) it will be seen that the value for $T_{oa}$ is by the adder 108A subtracted from a value or quantity equal to $T_a$. The difference, the deviation from scheduled interchange, is then integrated by the integrator 143 to provide at its output a quantity representative of the inadvertent interchange $I_a$ for the area A. The inadvertent interchange is now divided by a quantity representative of the time $H$ in hours in which the inadvertent interchange accumulations are to be corrected. It is important that the value of $H$ be the same throughout the interconnection. Depending upon the characteristics of the interconnection including the effectiveness of normal system control and the frequency and duration of emergency situations requiring assistance to an area from other areas, the value of $H$ may range from as low as a half-hour to as much as four hours or above. The value of $H$ is selected so that the correction of inadvertent interchange accumulations is fast enough to correct for normal regulation errors, for the tau errors and the phi errors, but slow enough to permit emergency frequency bias contributions to areas of need to persist. The output of divider 142 is applied to another adder 108 where it is algebraically added to the difference between measured and scheduled interchange respectively $T'_a$ and $T'_{oa}$. The resultant output is applied to another adder 92 which after algebraic subtraction of another input, a modified correcting quantity, provides the desired output of $E_a$, the generation correcting quantity for area A. The other input is provided by the solution of the remaining terms of Equation (7).

Referring now to the second parenthetical expression in Equation (7) and to the top of the diagram, FIG. 1, the adder 52 algebraically subtracts the quantity $f_o$ from quantity representing $f_a$. The output, representing frequency deviation from its schedule value is applied to the integrator 58. Its output is representative of time error. The output of the integrator is applied to a multiplier 62 which for a 60 Hertz system multiplies it by a quantity equal to 60b which then produces the quantity be as its output. In the adder 70 there is subtracted a quantity representing $f'_{oa}$ from $f'_a$ and there is also subtracted be. By now multiplying the output of adder 70 as by multiplier 84 by a quantity representing the factor $10B_a$, there is achieved the remaining solution of Equation (7), the final step of which is the subtraction by adder 92 of the modified correction signal, i.e., the output of multiplier 84 from the output of adder 108 to yield the previously mentioned generation control signal $E_a$.

Referring again to the alternative way of securing one of the input signals for multiplier 84, namely the signal on line 82a to replace the signal from line 82. With the switch 83 in the left-hand position the input to multiplier 84 is obtained from line 82 as already described. With the switch in the right-hand position there is now substituted the signal S from 82a in place of the aforementioned signal on line 82. The signal S is obtained from receiver $R_a$ responding to transmitter $T_s$ located at some central transmitting point on the interconnected power system as at line 73 in FIG. 2. The signal on line 73, FIG. 2, is derived in a manner as shown in the upper part of FIG. 2 as the output of summer 70. Its use will depend upon its availability at that location as a true measurement of system frequency $f_a$, a true value of system frequency schedule $f_o$, the integration of the difference as by computing units 52 and 58 respectively and multiplication by 60b as at multiplier 62. The signal S is then given by Equation (6). The use of the signal S in all areas of the interconnected power system for the complete parenthetical part of the last term of Equation (7), as shown for area A with switch 83 for all areas in its right-hand position, would eliminate all phi ($\phi$) factors for all areas, and thereby provide advantageous system operation and control.

As outlined in detail in my above referenced IEEE Paper No. 71TP81-PWR, the system of FIG. 1 provides for coordinated system-wide correction of both time error and inadvertent interchange accumulations. As further shown therein, when the algebraic sum of inadvertent interchange as used in Equation (7) for all areas of the interconnection is equal to zero, the coordinated controls will act to restore system frequency and to bring to zero any time error, while acting to correct each area's inadvertent interchange accumulation. On the other hand, as the paper additionally shows, if the inadvertent interchanges, as entering into Equation (7), are not algebraically equal to zero, as a result of human or equipment errors, then a sustained time error is needed in order collectively to balance Equation (7) for all areas of the interconnection.

A feature of my invention is that the coordinated controls in accordance with Equation (7) will automatically permit development of a sustained time error of magnitude needed to counterbalance the lack of inadvertent interchanges summing up to zero, while permitting system frequency automatically to be restored to 60 Hertz thereby continuing accumulation of a sustained time error. The following equation, taken from my paper, defines the sustained time error which the coordinated controls will develop to counterbalance unaccounted for inadvertent interchange which is to say the lack of inadvertent interchanges which algebraically add up to zero:

$$\epsilon = I_a + I_b + \ldots I_n / [10 (B_a + B_b \ldots B_n) (H) (b)] \quad (8)$$

As still additionally shown in the referenced IEEE Paper, the coordinated controls automatically allocate to each of the participating areas corrective action in proportion to the relative size of the area as defined by the ratio of the frequency bias setting of that area to the frequency bias setting of the entire interconnection.

As has already been stated, the input quantity $T_a$ to summer 108A of FIG. 1 may be available only periodically, as for example by periodic scanning of remote KWH meters on the tie-lines of the area. When such is the case the $I_a/H$ signal will be reset periodically as an input into summer 108, based on the last previous reading obtained from tie-line KWH meters. Such readings may be obtained orally or at other time intervals, using data gathering techniques well known in the art. It is very important, however, that when the $I_a/H$ factors are introduced periodically in this way, their introduction throughout the interconnection be synchronized, as by prior agreement, the updating occurring simultaneously at all areas of interconnection, and to cover periods of accumulation of agreed upon spans of time, common to all areas. In other cases where the $I/H$ signals are introduced continually, they must again be for a common span of time for all areas.

Referring now to FIG. 3, there is utilized in each of the interconnecting tie-lines 10, 12 and 14 a KWH meter such as the meters 16, 18 and 20. Such power-measuring meters are usually utilized in interconnected systems for the purpose of determining the true energy interchanges between adjacent areas. Each of the KWH meters is of the well-known rotating disc type which may, as in FIG. 3, produce output pulses upon each rotation of the disc. There are also utilized individual power-measuring elements such as thermal converters 22, 24, 32 33 35 and 37 in interconnecting tie-lines 10, 12 and 14 to provide basic power control as in FIG. 1. The thermal converters continuously provide signals such as a potential on their output lines representative of the power flow in the tie-line. There is thus provided by thermal converter 22 a signal on line 28 indicative of the power flow by way of the tie-line 10. Likewise, a potential appears on line 30 from the thermal converter 32 indicative of the power flow by way of the tie-line 14. For clarity of illustration, separate thermal converters have been shown in FIG. 3 on a given tie-line, one to serve each area. In practice a common thermal converter or measuring device serving the two areas connected by the tie-line may be used.

In addition to the measurement of the power supplied by way of the interconnecting tie-lines and the measurement of the power flow throughout a particular period in those lines, it is also necessary to measure the frequency of the system as by frequency meter 34. It is recognized that while the frequency in various parts of the system may instantaneously differ slightly at any particular time, it is recognized that the frequency in the steady state sense is the same throughout the system. Therefore it is possible to utilize a single frequency measurement such as a meter 34 for the purpose of establishing a common control signal for the areas A, B and C. Thus, the output of the frequency meter 34 as appearing on lines 38 and 72 is utilized in FIG. 3 in the computation of a correcting quantity ($S$) for each of the areas of the system which is transmitted by transmitter 40 to the respective area error-computation units provided for each of the areas, such as to the unit 42 provided for area A as well as to units 44 and 48 provided for areas B and C, respectively.

The correcting quantity $S$ in the form of an electrical signal, transmitted by the transmitter 40, is generated by transmitter 40 from a signal $S$ on line 50.

As shown in the drawing, the measured frequency $f$ is compared with the set frequency $f_0$ in the comparator 52. For the United States, $f_0$ will be 60 Hertz.

As already explained, the frequency meter 34 provides an electrical output signal of magnitude corresponding with the value of the measured system frequency. As illustrated, this will be a direct current signal. The set frequency $f_0$ is produced from the hand-set tap 54a of potentiometer 54 to provide a direct current signal. The comparator 52 provides an output on line 56 to the integrator 58 which then provides an electrical input on line 60 to a multiplier 62 which multiplies the integrated frequency deviation by the quantity (60b) which is derived from the hand-set tap 66a of potentiometer 66. There is then produced on line 68 an electrical signal ($b\epsilon$) which is introduced into the summing unit 70 which also has an input of an electrical signal representing the measured frequency as supplied by line 72 and the set frequency as supplied by way of line 74.

The summing unit 70 compares the measured frequency ($f$) with the set frequency ($f_0$) and subtracts the signal on line 68 representing the biased time error ($b\epsilon$) so as to provide on line 50 an output signal representing deviation of the system augmented by a factor related to the correction to be made for the time error which has accumulated. The magnitude of the correction quantity included in the output signal ($S$) is determined by the magnitude of the time error correction quantity $\epsilon$ and a factor ($b$) related to the rate at which the correction is to be made.

As shown in FIG. 3, the signal on line 50 provides an input to the transmitter 40 in this embodiment of the invention which then transmits that signal, the correcting quantity $S$, to all of the areas of the system for the purpose of computing in those areas the control quantity to be utilized in the control system of each of the areas. There is thus provided a common, or like, signal utilized by each of the areas to take into account the frequency deviation of the system and the time error correction required. This is accomplished by a single measurement of the frequency, the selection of the set frequency and the selection of the time error correction rate ($b$). The utilization of a single setting for each of the constants and a single measurement of the frequency makes possible the elimination of errors which normally occur in the setting of the desired frequency in the individual areas where individual setters are used. Errors are also avoided which may result from inaccurate measuring of the frequency at the individual areas by individual frequency measuring units. Likewise, there is prevented any disparity between the setting of the factor $b$ in each of the areas as could occur in any system which utilizes individual calculating arrangements for providing correction quantities which the present system provides on line 50.

It is emphasized here that the essential requirement is that each area shall utilize the identical signal representing the selected frequency $f_0$, the same time error bias setting ($b$) and that the described instrumentalities identically operate for each of the areas for performing the functions of the integrator 58, the multiplier 62 and the summing devices 52 and 70. FIG. 3 represents one way of meeting these requirements though, as mentioned above, the invention does not exclude other ways of meeting the foregoing requirements to eliminate error in (a) measurements, (b) setting of values or reference quantities, and (c) performing the described steps in respect of said quantities.

The output from each of transmitters 16a, 18a, 20a, 40, and 153 has been shown by broken-lines leading to the respective receivers. Conventional techniques may be utilized for transmitting the needed quantities to the several areas as by telemetry including broadcasting of signals representing the several quantities which by the several receivers reproduce said quantities by generation of signals including signals initiating concurrent operations at each area as will hereinafter be described.

There will now be described a manner in which there is achieved the combined and coordinated system-wide energy balancing in the control of the bulk power transfer amongst the several areas.

For area A there is provided the system shown as enclosed in block 42. Similar control systems are included in the blocks 44 and 48 for areas B and C.

Regarding the computation carried out in block 42 of the area error $E_a$ to be utilized in area A for the scheduled interchange to other areas or combined with other signals for the control of generation therein, as for economic dispatch, it will be evident from FIG. 3 that the signal on line 50 as transmitted by transmitter 40 is applied to receiver 80 for area A. That receiver provides a corresponding signal ($S$) on line 82, (switch 83 of FIG. 1 in its right-hand position). That signal is multiplied by the quantity $10B_a$ by multiplier 84. The quantity ($10B_a$) appears as an electrical signal on line 86 from the hand-set contact 88a of potentiometer 88. The factor ($10B_a$) is indicative of the frequency bias assigned to the control of area A.

The signal output on line 90 from the multiplier 84 is one of the inputs to a comparator 92 which has as its other input a signal on line 94 representative of the deviation of the net tie-line interchange from its scheduled value plus any corrections for inadvertent interchange which are to be made. As a result of the comparison in comparator 92, there is produced on line 96 a control signal $E_a$ which is then utilized as an input to the control system 11 of area A.

There will now be described how there is developed the signal on line 94 meeting the foregoing requirements as well as other important requirements.

It will be remembered that the signal on lines 28 and 30 represent the power interchange from area A over tie-lines 10 and 14, respectively. These direct current signals are added by the adder 100 so as to provide on line 102 a signal ($T'_a$) representing the measured net interchange for area A. That net interchange signal is compared with the signal ($T'_{oa}$) on line 104 which is derived from the adjustable tap 106a of potentiometer 106 and which represents the scheduled or desired net interchange. The signals on lines 102 and 104 are then compared in the summing unit 108 which also includes, as shown in the drawing, a signal for correcting for the inadvertent interchange ($I_a$); namely, a signal $I_a/H$ on line 110.

As will now be described, the computation of inadvertent interchange will be computed by utilizing the output of the interchange kilowatt-hour meters. Inadvertent interchange will accumulate if the net interchange as measured by the meters differs from the net interchange as measured by the thermal converters. It will also accumulate, if factors are present as described above, including the failure of the algebraic sum of the net interchange schedules to be equal to zero at all times, including periods of schedule change. Thus there is taken into account any differences in the measurements as provided by the thermal converters 22, 24, 32, 33, 35 and 37 as compared with the kilowatt-hour meters 16, 18 and 20.

As explained above, the kilowatt-hour meters 16 and 20, as well as the kilowatt-hour meter 18, are meters of the type which provide to their respective transmitters 16a, 20a and 18a, pulse signals upon each revolution of the metering disc so that the rate of pulse generation is a measure of the power flow in the respective tie-lines.

The pulses from transmitters 16a and 18a are applied to receivers 120 and 122 of system 42 for area A. The receivers 120 and 122 apply to bi-directional counters 121 and 123, respectively, corresponding pulses which through the action of digital-to-analog converters 125 and 127 produce electrical signals representative of the energy transferred in one direction or the other over the tie-lines. The digital-to-analog converters may be of any well-known type such as that described in Hansen U.S. Pat. No. 2,718,634. The respective outputs of the converters 125 and 127 are applied to an adder 124 which generates and applies an electrical signal to line 126 representative of the measured net interchange. This signal on line 126 is then applied to a comparator 130 which also receives a signal applied to it by way of line 128. That signal is developed from the quantity ($T'_{oa}$) developed by the potentiometer 106. By means of a pulse generator 137 and a bi-directional counter 139, there is developed on line 134 a digital signal indicative of the electrical signal representative of ($T'_{oa}$).

The pulse generator 137 may be of any of the well-known types of which the one disclosed in the Stevanov U.S. Pat. No. 3,010,078 may be taken as illustrative.

The digital output on line 134 is applied to the digital analog converter 141 which develops an electrical signal applied to comparator 130. The comparator 130 algebraically subtracts the signal on line 128 from the signal on line 126 to develop an output quantity on line 140 in the form of an electrical signal which is representative of the magnitude of the inadvertent interchange ($I_a$), in kilowatt-hours.

The signal or quantity representing inadvertent interchange ($I_a$) is now modified by a factor ($H$) representative of the rate at which the correction is to be made. Stated differently it represents the time period over which correction is to be made for inadvertent interchange. This value is preset by the positioning of contact 146a of potentiometer 146 to generate a control signal representative of the selected time period over which the correction is to take place. The resultant output from the division by the divider 142 is the production on line 148 of the corrective signal $I_a/H$. In the embodiment of FIG. 3, it is applied to a sample-and-hold circuit. Any suitable type may be utilized such for example as that shown in Jones et al. U.S. Pat. No. 3,390,347. The sample-and-hold circuit 150 is enabled or rendered operative for each area control system (42, 44 and 48) as by a suitable source 151 of a synchronizing signal applied to a transmitter 153 and then transmitted to each area control system. Thus that signal is received by receiver 155 which by way of line 157 actuates the sample-and-hold circuit 150 in synchronism with comparable action in all areas. For area A, the synchronizing signal from the transmitter 153 is applied to a receiver 155 by way of line 157 which enables or produces operation of the sample-and-hold circuit 150 concurrently with those of the other control systems to apply to line 110 a signal representative of the quantity $I/H$ in kilowatts. Also, as shown, receiver 159 upon closure of switch 165 applies signals by way of lines 161 and 163 to reset the counters 121 and 123 and 139. The reset switch 165 will be used to set or to reset the initiation of the common span of time for all areas, as shown by the broken lines.

The value of $H$ is readily determined by inspection as to whether or not the inadvertent interchange continues to increase or approaches zero as a limit. The requirement is that a particular area, by reason of the imposed control signal, should not withdraw the assistance it gives to other areas by basic tie-line bias-action when frequency is off normal.

The signal $I_a/H$ on line 110 is added by adder 108 to the signal representing the tie-line interchange as measured by the thermal converters 22 and 32. From their sum there is subtracted the signal on line 104 representative of the scheduled interchange. The resultant error signal developed on line 94 is then applied to the adder 92 for the development of $E_a$ which is the control quantity applied by way of line 96 to the control system 11 for area A.

Concurrently, like signals are developed at the remaining areas, and the areas comprising the interconnection as a whole cooperatively change generation by controlled amounts and rates in directions to reduce the respective control quantities $E$ to zero. Area inadvertent interchanges and the system time error both approach zero as a limit.

By reason of the method and system which has been described, there has been minimized, if not avoided entirely, any upset in tie-line power flow by reason of the time error correction and there has been mimimized, if not avoided entirely, the accumulation of time error by reason of inadvertent interchange correction.

Further in connection with the system of FIG. 3 it will be understood that both the KWH meters and the thermal converters have been utilized. The arrangement of FIG. 2 illustrates that single metering sources for the measurement of net interchange power and net interchange energy for each area may be utilized whether those sources be the KWH meters or whether they be thermal converters, or other types. Where reference has been made to addition and subtraction of quantities, it is to be understood that algebraic addition and subtraction is contemplated. The devices referred to as adders or comparators may be of like construction, the requirement being that the polarities of the signals applied thereto shall be as indicated and as appearing in the applicable equations of the corresponding terms. In the practice of the methods embodying this invention, digital techniques partly embodied in the above systems may be utilized for all computations and for development or generation of the needed control quantities including their application to the generating sources.

What is claimed is:

1. The method of automatically computing a control quantity for each of the interconnected areas of a multi-area power system such that the control quantities will be indicative respectively of the changes in generation required in each of the areas of the power system to tend to maintain the average interchange of power over interconnecting the tie-lines of each area on a predetermined schedule by reducing toward zero accumulated inadvertent interchange of each area and simultaneously to tend to maintain the average frequency of the system as a whole at a predetermined value for the correction of time-error in the system, comprising the steps of:

generating first quantities for each area in accordance with the difference between a quantity representative of the scheduled net interchange of power and a quantity representative of the measured interchange of power summed with a quantity representative of the quotient of the inadvertent interchange ($Ia$) for the corresponding area over a span of time common to all areas, divided by a time-period divisor ($H$) common to all area, generating a second quantity ($S$) in accordance with the difference between a quantity representative of a desired frequency of the system and a quantity representative of a measured frequency of the system minus a quantity representative of the time integral of that difference over a predetermined time period which is common to all areas multiplied by a quantity representative of a bias-factor common to all areas, generating a third quantity for each area in accordance with the product of said second quantity and a frequency bias setting for the corresponding area, and subtracting said third quantity for each of said areas from the corresponding one of said first quantities for producing said control quantities.

2. The method of claim 1 in which the additional step is performed of changing the generation of each said area in response to said control quantities in amount and direction to reduce in magnitude said control quantities.

3. The method of claim 1 in which said inadvertent interchange ($I$) which is divided by the divisor ($H$) is generated in part by output signals from the outputs of kilowatt hour meters.

4. The method of claim 1 in which said second quantity ($S$) is transmitted to each area from a single source.

5. The method of automatically computing a control quantity for each of the interconnected areas of a multi-area power system such that the control quantities will be indicative respectively of the changes in generation required in each of the areas of the power system to tend to maintain the average interchange of power over interconnecting tie-lines of each area on a predetermined schedule by reducing toward zero accumulated inadvertent interchange of each area and simultaneously to tend to maintain the average frequency of the system as a whole at a predetermined value for the correction of time-error in the system, comprising the steps of:

generating first quantities for each area in accordance with the difference between a quantity representative of the scheduled net interchange of power and a quantity representative of the measured interchange of power summed with a quantity representative of the quotient of the inadvertent interchange ($Ia$) for the corresponding area over a span of time common to all areas, divided by a time-period divisor ($H$) common to all areas, generating a second quantity ($S$) in accordance with the difference between a quantity representative of a desired frequency of the system and a quantity representative of a measured frequency of the system minus a quantity representative of the time integral of that difference over a predetermined time period which is common to all areas multiplied by a quantity representative of a bias-factor common to all areas, generating a third quantity for each area in accordance with the product of said second quantity and a frequency bias setting for the corresponding area, subtracting said third quantity for each of said areas from the corresponding one of said first quantities for producing said control quantities, and changing the generation of each said area in response to said control quantities in amount and direction to reduce in magnitude said control quantities thereby introducing a sustained time-error of magnitude needed to counterbalance the lack of addition to zero of the inadvertent interchanges throughout the interconnection while permitting the measured frequency of the system to be restored to its desired value, the magnitude of the additional corrective action of each area being in proportion to the relative size of that area defined as the ratio of the frequency bias setting of that area to the frequency bias setting of the entire interconnection and when the algebraic sum of inadvertent interchange for all areas is equal to zero further changing generation to bring to zero accumulated time-error.

6. In an interconnected power system having a plurality of areas interconnected by tie-lines over which scheduled inter-area flow of power and periodic balancing of scheduled energy transfer is desired with maintenance of frequency at a selected value, a computing system for computing a control quantity for each of said interconnected areas such that the control quantities will be indicative respectively of the changes in generating required in each of said areas to tend to maintain the average interchange of power over the tie-lines interconnecting the areas on a predetermined schedule by reducing toward zero accumulated inadvertent interchange and simultaneously to tend to maintain the average frequency of the system as a whole at said predetermined value for the correction of time-error in the system, comprising:

means for generating first quantities for each said area in accordance with the difference between a quantity representative of the scheduled net interchange of power and a quantity representative of the measured interchange of power summed with the quotient of the inadvertent interchange ($Ia$) for the corresponding area over a span of time common to all areas, divided by a time-period divisor ($H$) common to all areas, means for generating a second quantity ($S$) in accordance with the difference between a quantity representative of a desired frequency of said system and a quantity representative of a measured frequency of said system minus the time integral of that difference over a predetermined time period which is common to all said areas multiplied by a bias-factor common to all said areas, means for generating a third quantity for each said area in accordance with the product of said second quantity and a quantity representative of a frequency bias setting for the corresponding one of said areas, and means for subtracting said third quantity for each of said areas from the corresponding one of said first quantities for producing said control quantities.

7. The system of claim 6 in which there are provided means responsive to said control quantities for changing the generation of each said area in amount and direction to reduce in magnitude said control quantities.

8. The system of claim 6 in which there are provided transmitting means responsive to said means for generating said second quantity for transmittal of said second quantity to each of said areas.

* * * * *